United States Patent
Blaustein

(10) Patent No.: US 6,618,885 B1
(45) Date of Patent: Sep. 16, 2003

(54) WIRE-STRIPPING TOOL

(76) Inventor: Joseph Karl Blaustein, HC04 9130, Palmer, AK (US) 99645

( * ) Notice: Subject to any disclaimer, the term of this patent is extended or adjusted under 35 U.S.C. 154(b) by 0 days.

(21) Appl. No.: 09/518,835

(22) Filed: Mar. 3, 2000

(51) Int. Cl.[7] .................................................. B25F 1/00
(52) U.S. Cl. ............................. 7/107; 81/9.41; 81/9.42; 81/9.43
(58) Field of Search ............................... 7/107; 81/9.41, 81/9.42, 9.43, 9.44

(56) References Cited

U.S. PATENT DOCUMENTS 4,607,544 A * 8/1986 Jewell, Jr.
4,625,596 A * 12/1986 Makus
5,280,659 A * 1/1994 Park
5,711,182 A * 1/1998 Yang

* cited by examiner

Primary Examiner—Joseph J. Hail, III
Assistant Examiner—Willie Berry, Jr.
(74) Attorney, Agent, or Firm—Michael J. Tavella

(57) ABSTRACT

A wire-stripping tool that has a pair or more of cutters sized for one gauge of wire. For example, instead of be able to strip 18, 16, 14, 12, and 10 gauges of wire, the device has cutters that strip 18, 12, 12, and 10 gauges of wire. Other variations include designs that can strip up to four wires of the same gauge. With this tool, a user can place two or more wires into the cutters and strip them at the same time. The number of bending holes can be increased to coincide with the number of wires capable of being stripped simultaneously. Slots may also be added instead of, or in conjunction with, the bending holes. Specific strippers can be designed for specific combinations of wire sizes and cables. In this way, the labor required to prepare wires can be cut down significantly.

15 Claims, 6 Drawing Sheets

WIRE-STRIPPING TOOL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to wire-stripping tools and particularly to wire-stripping tools having jaws to strip two or more wires of identical size simultaneously.

2. Description of Related Art

Wire-stripping tools have been in use since the use of insulation. One of the most popular tools uses a pivoting handle to operate a pair of jaws. The jaws have a wire cutter and a series of cutters designed to fit around a specific size wire. The cutter clamps through the insulation around the wire, but does not cut the wire itself. Referring now to FIG. 1, a typical prior art wire stripper 100 is shown. This tool has a cutter head 101, discussed below, and a pair of handles 102 that are connected by a pivot assembly 103 as shown. The device is used by opening and closing the handles 102 to activate the cutter head 101.

FIG. 2 shows the cutter head 101. The head has a pair of jaws 104. At the top of the jaws is a crimper or pliers jaw 105. Below that, is a number of cutting jaws for stripping wire 106–110. These jaws are used to strip the insulation off wires. Each jaw is sized for a different wire gauge. These gauges are marked on the cutter for convenience. As shown, they range from 18 gauge to 10 gauge.

At the bottom of the cutter head are two holes 120. These holes can be used for bending wires. Typically, when making up an electrical device, the wires are wrapped around a connecting screw. These holes allow a worker to quickly form the bend in the wire to fit around the screw.

These tools have proved to be very useful for electrical work. They have only one major flaw-they are limited to bending or stripping one wire of the same gauge at a time. As electrical circuits became standardized, metallic sheathed cable and nonmetallic sheathed cables were developed. The most common of these cables has a pair of insulated wires and a bare ground wire. Once the outer sheath has been removed, the insulated wires must be stripped for use. As mentioned above, the stripping tools allow the user to strip only one of these wires at a time. This increases the time spent on wire preparation. It also increases the likelihood of injuries due to repetitive stress. Today, telephone cables, coax cables and other wiring configurations are used for a multitude of purposes. These cables, and the wires contained in them, must be stripped before installation and use.

BRIEF SUMMARY OF THE INVENTION

The instant invention overcomes these limitations. It is a wire-stripping tool that has a pair or more of cutters sized for one gauge of wire. For example, instead of be able to strip 18, 16, 14, 12, and 10 gauges of wire, the instant invention has cutters that strip 18, 12, 12, and 10 gauges of wire. With this tool, a user can place two or more wires of the same gauge from a cable into the cutters and strip them at the same time. Moreover, the tool has additional bending holes. This allows the user to place more than one wire through the holes for bending at the same time. In this way, the labor required to prepare wires can be cut down significantly. In one embodiment, the holes are replaced with slots to allow a number of smaller gauge wires to be bent at a time. Also, designs that incorporate cutters for specific types of cables are included. For example, one embodiment is a stripper that can strip non-metallic sheathed cable and strip two wires of the same gauge. Another embodiment has strippers for telephone cables with cutters for stripping fine 22 gauge wires. A stripper is also disclosed for stripping coax cable and its internal wire.

DETAILED DESCRIPTION OF THE INVENTION

Figures 1, 2:
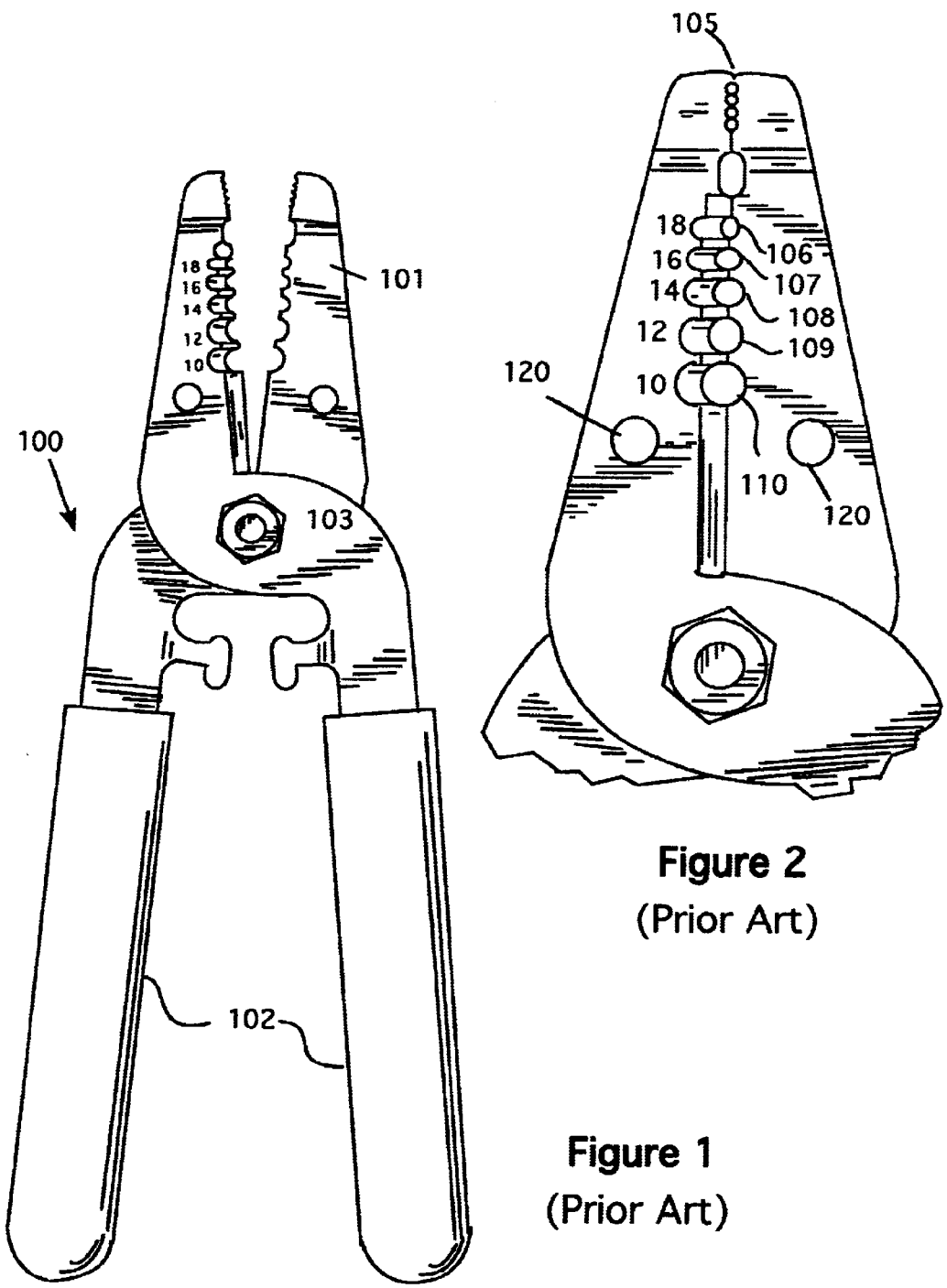
FIG. 1 is a front view of a wire stripper as prior art.
FIG. 2 is a detail view of the cutting head of the stripping tool as prior art.
Figures 3, 4:
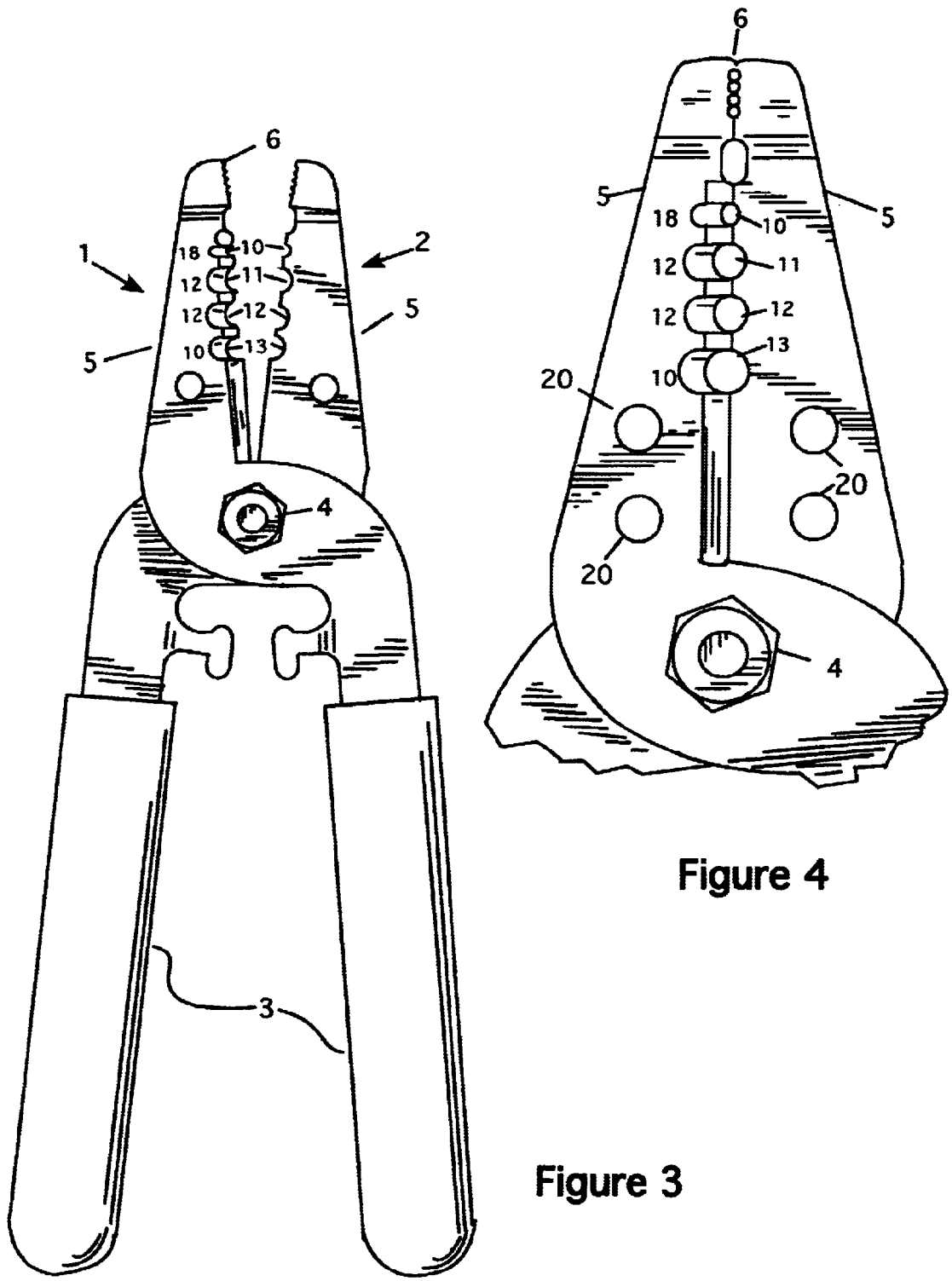
FIG. 3 is a front view of the instant invention.
FIG. 4 is a detail view of the cutting head of the instant invention.

Referring now to FIG. 3, the instant invention 1 is shown. This tool has a cutter head 2, discussed below, and a pair of handles 3 that are connected by a pivot assembly 4 as shown. The device is used by opening and closing the handles 3 to activate the cutter head 2.

FIG. 4 shows the cutter head 2. The head has a pair of jaws 5. At the top of the jaws is a crimper or pliers jaw 6. Below that, is a number of cutting jaws for stripping wire 10–13. These jaws are used to strip the insulation off wires. Unlike the prior art, however, these cutters are not all different sizes. The uppermost jaw 10 is designed for small wire, such as 18 gauge. There are two center cutters 11, 12 are designed to strip 12 gauge wires. The bottom cutter 13 is designed to strip a 10-gauge wire.

The purpose for doubling the 12-gauge cutter is to permit stripping of two 12-gauge wires at the same time. As discussed above, the most commonly used type of non-metallic sheathed cable has two insulated 12 gauge wires and a bare ground wire. The instant invention allows a worker to strip both of the 12 gauge wires at one time. This reduces the amount of time needed to prepare the cables and reduces the amount of repetitive motion involved. Moreover, the tool can also strip any pair of 12 gauge wires. As discussed below, tools can have a plurality of cutters for cutting up to four wires of the same gauge at one time.

Figure 5:
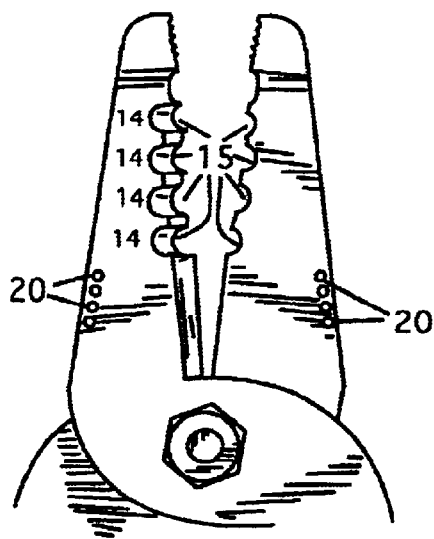
FIG. 5 is a second embodiment of the invention.
Figure 6:
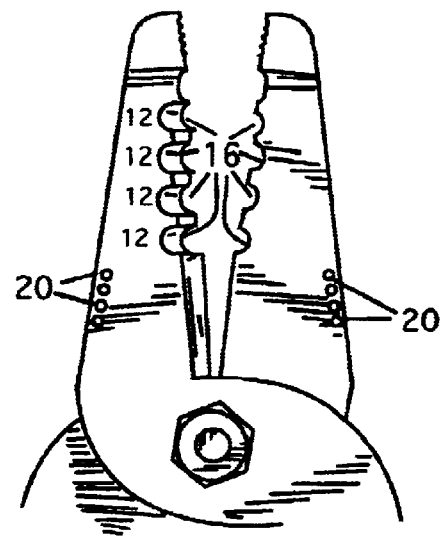
FIG. 6 is a third embodiment of the invention.
Figure 7:
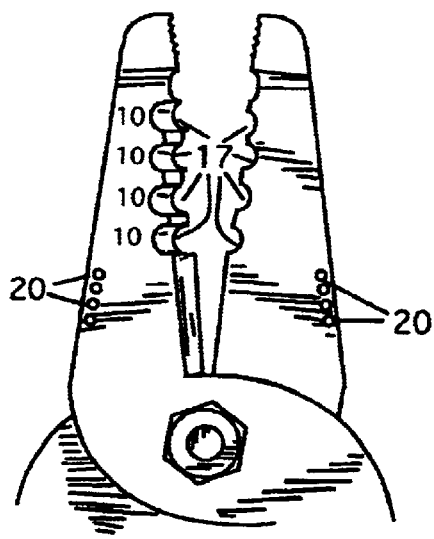
FIG. 7 is a fourth embodiment of the invention.

The tool also has two pairs of holes 20 at the base of the jaws 5. These holes 20 are used to bend the wires for installation, as discussed above. Here, however, both wires can be bent at the same time. As shown in FIGS. 5–7, additional holes may be added up to the number of same-sized cutters, if desired. Thus, FIG. 5 shows four same-sized cutter heads and four bending holes 20.

The tool is used as follows for 12-gauge non-metallic sheathed cable: first, a sufficient length of the cable's outer sheath is removed to reveal the wires for installation. Next, the wires are brought together for stripping. The user then clamps the 12-gauge cutter on both wires. The user then removes a length of insulation from both wires. Next, if desired, the user places the bared wires into one of the pair of holes 20 and bends them for installation.

There are many variations that can be made of this design. For example, FIG. 5 is a second embodiment showing four cutters 15 all of 14-gauge size. FIG. 6 shows an embodiment having four 12-gauge cutters 16. FIG. 6 shows an embodiment having four 10-gauge cutters 17. These cutters are used when preparing several wires of the same gauge that are in a box.

Figure 8:
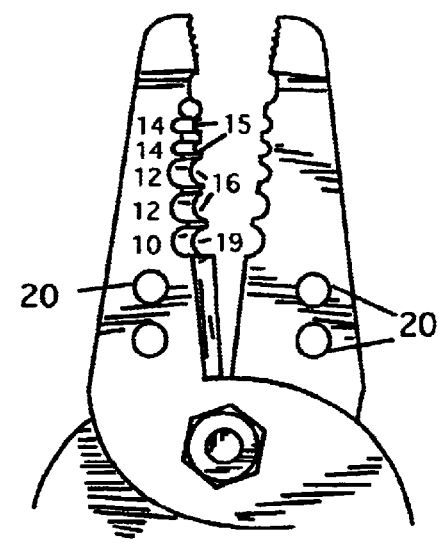
FIG. 8 is a fifth embodiment of the invention.

FIG. 8 shows an embodiment having a pair of 14 gauge cutters 15, a pair of 12 gauge cutters 16 and a single 10 gauge cutter 17.

Figure 9:
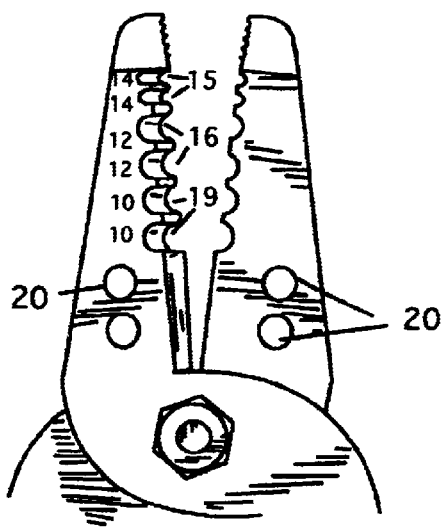
FIG. 9 is a sixth embodiment of the invention.

FIG. 9 shows an embodiment having two 14-ga. cutters 15, two 12-ga. cutters 16 and two 10-ga. cutters 17.

Figure 10:
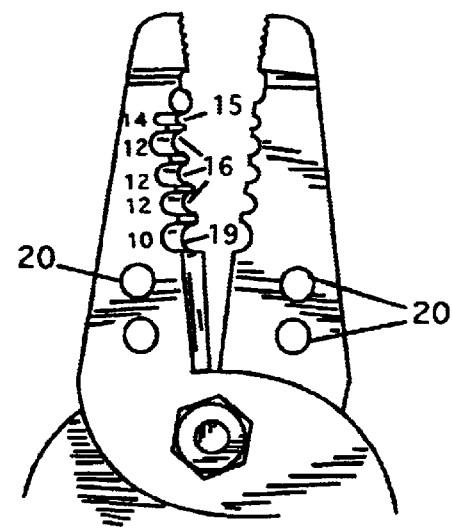
FIG. 10 is a seventh embodiment of the invention.

FIG. 10 shows an embodiment that has one 14-ga. cutter 15, three 12-ga cutters 16 and one 1-qga. cutter 17.

Figure 11:
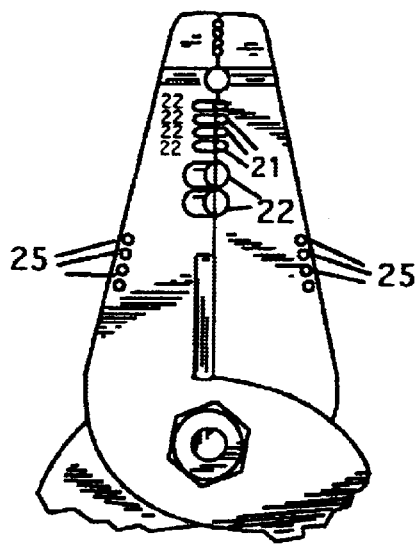
FIG. 11 is an eighth embodiment of the invention.
Figure 12:
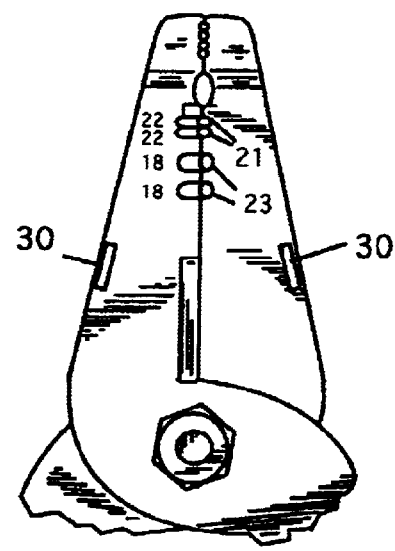
FIG. 12 is a ninth embodiment of the invention.

FIGS. 11–15 show another set of embodiments that include other features for specialized applications. FIG. 11 shows a stripper having four 22-gauge cutters 21 and a pair of telephone cable strippers. Here, the pair of holes 20 has been replaced with a series of four small holes 25. These holes are sized to bend the smaller 22-gauge wire. FIG. 12 shows yet another variation. Here, two 22-gauge cutters 21 are combined with a pair of 18 gauge cutters 23. The four holes of FIG. 11 have been replaced with a pair of slots 30. These slots enable the user to insert four wires into the slots. In addition, two small holes 30a may be added as shown. Note that slots can be used with holes in any configuration. For example, slots may be added to the cutter head of FIG. 11 or any of the other configurations.

Figure 13:
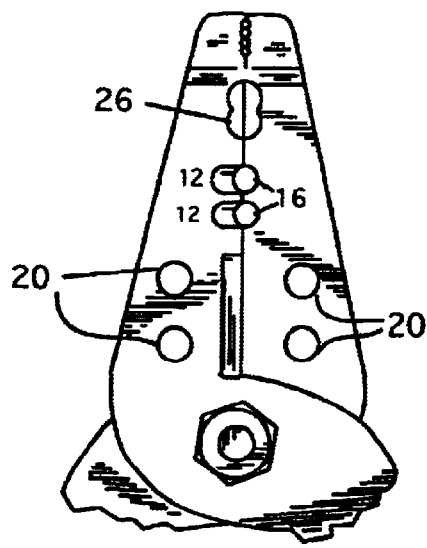
FIG. 13 is a tenth embodiment of the invention.

FIG. 13 shows yet another variation. Here, a non-metallic sheathed cable stripper 26 is added to the cutter heads. A pair of 12 gauge cutters 16 is also provided as shown. This allows a worker installing two-wire non-metallic sheathed cable to quickly prepare the cables for installation and finishing.

Figure 14:
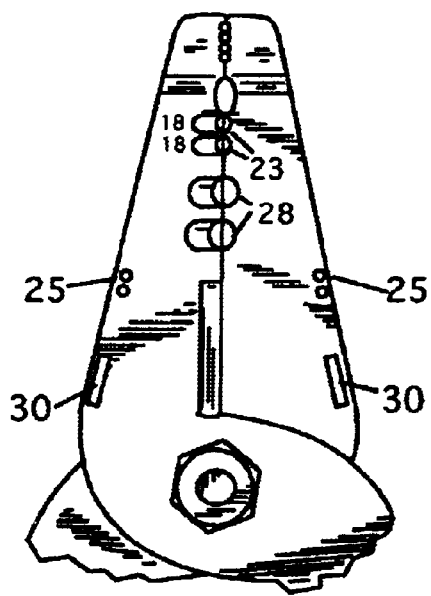
FIG. 14 is a eleventh embodiment of the invention.

FIG. 14 shows a stripper designed for use with coax type cable. Here, a pair of 18 gauge cutters 23 is shown. A pair of cutters 28 designed to strip coax cable is also included as shown.

Figure 15:
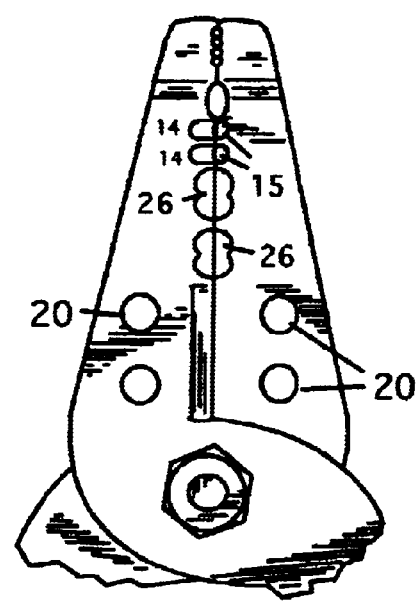
FIG. 15 is a twelfth embodiment of the invention.

Finally, FIG. 15 shows a stripper that has a pair of non-metallic sheathed cable strippers 26 and a pair of 14 gauge wire strippers 15 as shown.

Of course, in any of these designs the size of the cutters can be changed. Thus, in FIG. 15, the 14 gauge strippers can be replaced with 12 gauge strippers. There is no limit to the number of possible combinations and variations available. However, if too many combinations are used, it is possible that the tool may be too difficult to use. The variations shows are the preferred variations for the different types of work available.

Although the illustrations shown have the wire-stripping cutters on top of the pivot point, they can be located under the pivot point as well. Several tools have crimping heads for compressing connectors in the upper portions of the tool and have the stripping cutters located between the handles. These tools can be easily modified by modifying the sizes of the stripping cutters as described above. Moreover, other common stripping tools, such as the STRIPMASTER type wire strippers available for Ideal Corporation. This type of stripper has replaceable cutter heads that can be easily machined to strip more than one wire at a time.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:
1. A wire-stripping tool comprising:
 a) a pair of cutting jaws, the pair of cutting jaws forming a cutting head; and
 c) a means for stripping a plurality of wires, formed in said cutting head, whereby said means for stripping being sized to simultaneously strip a plurality of wires having a same gauge.
2. The wire-stripping tool of claim 1 wherein the means for stripping a plurality of wires includes two equally sized stripping cutters being positioned adjacently, to allow stripping of a pair of equally sized wires simultaneously.
3. The wire-stripping tool of claim 1 wherein the means for stripping a plurality of wires includes three equally sized stripping cutters being positioned adjacently, to allow stripping of three equally sized wires simultaneously.
4. The wire-stripping tool of claim 1 wherein the means for stripping a plurality of wires includes four equally sized stripping cutters being positioned adjacently, to allow stripping of four equally sized wires simultaneously.
5. The wire-stripping tool of claim 1 further comprising at least one pair of holes, positioned on one of said pair of cutting jaws for bending a pair of wires simultaneously.
6. The wire-stripping tool of claim 5 further comprising a second pair of holes, positioned on the second of said pair of cutting jaws for bending a pair of wires simultaneously.
7. The wire-stripping tool of claim 1 wherein said pair of cutting jaws further comprise a plurality of holes formed therein for bending a plurality of wires.
8. The wire-stripping tool of claim 1 wherein said pair of cutting jaws further comprise at least one slot formed therein for bending a plurality of wires simultaneously.
9. The wire-stripping tool of claim 1 further including a pair of cutters for stripping an outer insulation layer from non-metallic sheathed cable formed in said cutting head.
10. The wire-stripping tool of claim 9, further comprising a second pair of cutters for stripping an outer insulation layer from non-metallic sheathed cable formed in said cutting head.
11. The wire-stripping tool of claim 1 further including a pair of cutters for stripping an outer insulation layer from telephone cable formed in said cutting head.
12. The wire-stripping tool of claim 1 further including a pair of cutters for stripping an outer insulation layer from coaxial cable formed in said cutting head.
13. A wire-stripping tool comprising:
 a) a pair of cutting jaws, the pair of cutting jaws forming a cutting head;
 b) two equally-sized stripping cutters being positioned adjacently, to allow stripping of a pair of equally-sized wires simultaneously, formed in said cutting head; and c) a pair of cutters for stripping an outer insulation layer from non-metallic sheathed cable formed in said cutting head.

14. The wire-stripping tool of claim 13 further comprising at least one pair of holes, positioned on one of said pair of cutting jaws for bending a pair of wires simultaneously.

15. A wire-stripping tool comprising:
   a) a pair of cutting jaws, the pair of cutting jaws forming a cutting head;
   b) four equally-sized stripping cutters being positioned adjacently, to allow stripping of four equally-sized wires simultaneously, formed in said cutting head;
   c) a pair of cutters for stripping an outer insulation layer from telephone cable formed in said cutting head; and
   d) at least one slot formed is said cutting head, for bending a plurality of wires simultaneously.

* * * * *